United States Patent [19]

Sauvageot et al.

[11] Patent Number: 6,061,013

[45] Date of Patent: May 9, 2000

[54] METHOD FOR DETERMINING THE PRECIPITATION RATIO BY DOUBLE POLARIZATION RADAR AND METEOROLOGICAL RADAR FOR IMPLEMENTING SUCH PROCESS

[75] Inventors: Henri Sauvageot, Labarthe-Inard; Daniel Beguin, Saint leu la Foret; Régis Devinne, Beauchamp, all of France

[73] Assignee: Thomson-CSF, Paris, France

[21] Appl. No.: 09/091,828

[22] PCT Filed: Dec. 13, 1996

[86] PCT No.: PCT/FR96/02006

§ 371 Date: Jun. 26, 1998

§ 102(e) Date: Jun. 26, 1998

[87] PCT Pub. No.: WO97/24629

PCT Pub. Date: Jul. 10, 1997

[30] Foreign Application Priority Data

Dec. 26, 1995 [FR] France .................................. 95 15483

[51] Int. Cl.⁷ ..................................................... G01S 13/95
[52] U.S. Cl. .............................................................. 342/26
[58] Field of Search .................................. 342/26; 702/3; 73/170.16

[56] References Cited

PUBLICATIONS

Journal of Atmospheric and Oceanic technology, vol. 11, 1994, "A Robust Estimator of Rainfall Rate Using Differential Reflectivity", Eugenio Gorgucci, et al.(pp. 586–592).

Radio Science, vol. 19, 1984, "Assessment of the Contribution of Differential Polarization to Improved Rainfall Measurements", Carlton W. Ulbrich, (pp. 49–57).

Scarchilli et al.; Self–Consistency of Polarization Diversity Measurement of Rainfall; IEEE Transactions on Geoscience and Remote Sensing; vol.: 34 1, pp. 22–26, Jan. 1995.

Smirnov et al.; Estimation of rain rate by microwave radiometry and active radar during Cleopatra 92; International Geoscience and Remote Sensing Symposium, '93. Better Understanding of Earth Environment; pp. 1244–1246 vol. 3, Aug. 1993.

*Primary Examiner*—Daniel T. Pihulic
*Attorney, Agent, or Firm*—Oblon, Spivak, McClelland, Maier & Neustadt, P.C.

[57] ABSTRACT

A method for determining precipitation rate including on the basis of the signals received on the two polarization channels $\vec{H}$ and $\vec{V}$ of the radar, in firstly determining an estimate of the precipitation rates $\bar{R}_\alpha$ in each range gate i along the radar beam for a single polarization, then a first estimated value ($\bar{I}_1$) of the integral of the precipitation rates and, finally, on the basis of the attenuated reflectivity coefficient ($Z_{H\alpha}(r)$), an estimate of the unattenuated differential reflectivity coefficient ($Z_{DRs}(r)$). Furthermore, the measured value of the attenuated differential reflectivity coefficient ($Z_{DRs}(r)$) is determined, and the integral ($\bar{I}_2$) of the precipitation rates is deduced therefrom, then is compared with the first estimated value ($\bar{I}_1$) so as to iteratively adjust a parameter ($\alpha$) of the method when applied to the polarization H alone. When $\alpha$ has been adjusted, corrected values of the unattenuated reflectivity coefficient and the precipitation rate are provided.

20 Claims, 2 Drawing Sheets

METHOD FOR DETERMINING THE PRECIPITATION RATIO BY DOUBLE POLARIZATION RADAR AND METEOROLOGICAL RADAR FOR IMPLEMENTING SUCH PROCESS

BACKGROUND OF THE INVENTION

1. Field of the Invention

The present invention relates to a method for determining the precipitation rate and reflectivity factor of a hydrometeor using pulsed radar operating at a wavelength which is attenuated by hydrometeors, and to a dual polarization meteorological radar implementing this method.

2. Discussion of the Background

In meteorology, it is necessary to observe rainfall and other hydrometeors, in particular for the purpose of short term forecasting. To this end, consideration has for a number of years been given to using radar for quantitatively determining the precipitation rate, this being a characteristic parameter of these phenomena. To do this, use is made of methods based on measuring the reflectivity of the rain or hydrometeors when illuminated with a radar beam. However, for most of these methods, attenuation by the hydrometeors biases the measurements, and it is therefore necessary to operate at wavelengths which are attenuated as little as possible, and are therefore relatively high. This leads to working difficulties and high cost.

Another, more attractive method has been proposed: that of attenuation for two wavelengths and a single polarization, and this has the advantage of being independent of the calibration of the radar. However, this method leads to certain technical difficulties in obtaining measurements with the required precision. This is because problems are encountered in making the beams at the two wavelengths coincide and in the measurements being simultaneous.

All the studies which have been carried out demonstrate the benefit of using radars with shorter wavelength, making it possible to choose more compact and less expensive equipment. However, this would entail problems of correcting attenuation which are very difficult to solve, in particular when there is heavy precipitation.

SUMMARY OF THE INVENTION

The invention relates to a method which overcomes these drawbacks in spite of the use of short wavelengths which lead to relatively high attenuation of the electromagnetic waves on the return path through the absorbent medium which the hydrometeors (rain, hail, clouds) constitute.

The invention is based on the use of a dual polarization radar to measure the reflectivities in the two polarization components $\vec{H}$ and $\vec{V}$ while correcting the effects of attenuation on the obtained values by virtue of the differential measurements which are taken.

The invention therefore provides a method for determining the precipitation rate and reflectivity factor of a hydrometeor using pulsed radar operating at a wavelength which is attenuated by the said hydrometeor, the said radar being a dual polarization radar delivering a double series of measurements of the attenuated reflectivity factor ($Z_{Ha}$ (r), $Z_{Va}$ (r)) for the various range gates according to each of the polarizations, the said method being characterized in that it comprises the following steps:

A) in each range gate of the radar, determining a first estimate of the precipitation rate ($R_s$) on the basis of the reflectivity factor measured for a single polarization, by a combination of the equations connecting the reflectivity factor with the precipitation rate and the attenuation coefficient for a single polarization with the precipitation rate;

B) on the basis of the said first estimate of the precipitation rate, obtaining an estimated value of the unattenuated differential reflectivity factor ($Z_{DRs}$);

C) from the said estimated value of the unattenuated differential reflectivity factor ($Z_{DRs}$) and the radar measurement of the attenuated differential reflectivity factor ($Z_{DRa}$), deducing an estimated value of the differential polarimetric attenuation ($A_{DP}$); and D) attempting to obtain equality between the integral ($I_1$ (r, R)) of the precipitation rate estimated in step A for a single polarization of the radar and the integral ($I_2$ (r, R)) of the precipitation rate deduced from the said differential polarimetric attenuation ($A_{DP}$), by iterative adjustment of one of the parameters ($\alpha$, $\beta$) in the equation connecting the reflectivity factor with the precipitation rate, so as to make it possible to extract the corrected values of the unattenuated reflectivity factor ($Z_{Hs}$ (r)) and the precipitation rate ($R_s$ (r)).

The great advantage of this method is that it is independent of the calibration of the radar and of the attenuation by possible undetected clouds, because it is based on a differential measurement.

Another aspect of the invention provides a dual polarization meteorological radar operating with pulses at a wavelength which is attenuated by hydrometeors, for determining the precipitation rate and the reflectivity factor, the said radar having:

a dual polarization antenna (1) associated with means for extracting the modes corresponding to two orthogonal polarization channels $\vec{H}$ and $\vec{V}$;

a transmitter delivering pulses to the two channels of the said antenna;

at least one reception channel for processing the signals output by the two orthogonal polarization channels; the said radar being characterized in that it has a digital signal processing device designed for making use of the method described above.

BRIEF DESCRIPTION OF THE DRAWINGS

The invention will be understood more clearly, and other characteristics and advantages will become apparent by virtue of the following description and the appended drawings, in which.

DETAILED DESCRIPTION OF THE PREFERRED EMBODIMENTS

Figure 1:
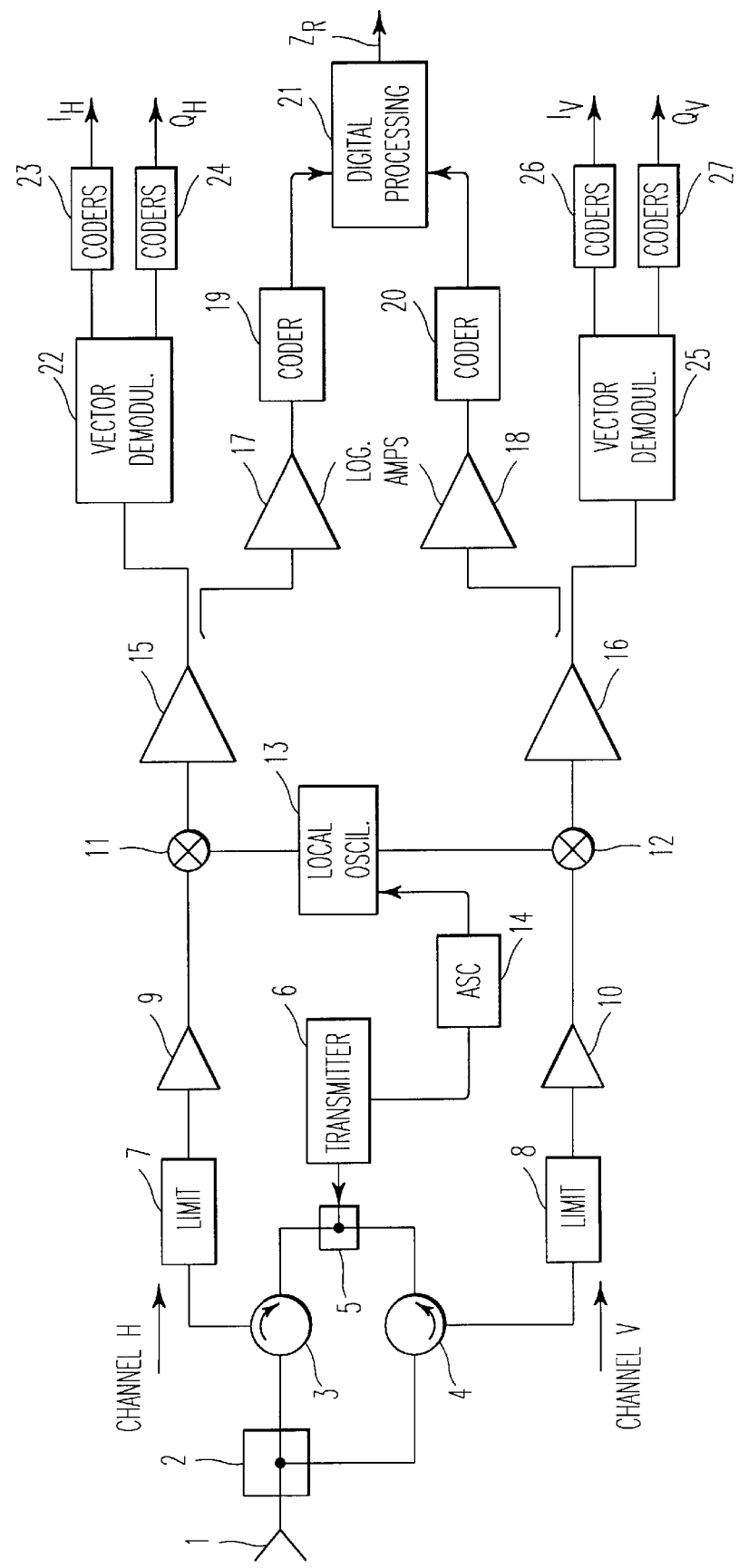
FIG. 1 is a diagram of a meteorological radar according to the invention.

FIG. 1 represents the diagram of a double polarization meteorological radar. This radar has a dual polarization antenna comprising a dual polarization primary source 1 which illuminates a reflector (not shown). This source is associated with a mode (orthomode) extractor 2 with two polarization channels $\vec{H}$ and $\vec{V}$. This primary source is fed by a pulsed transmitter (6) which delivers pulses with a repetition frequency matched to the desired range (for example $F_r$=1 kHz for a range of 150 km). The transmission power is distributed to the two channels of the antenna via a magic T in order to obtain a polarization oriented at 45° relative to the horizontal, or by a 3 dB coupler, 5, in order to obtain a circular polarization. These two transmission modes are a priori equivalent since the intention is to transmit and receive two signals with orthogonal polarizations and process them on the basis of their amplitude. Circular polarization has a secondary advantage in terms of the standing wave ratio reflected by the antenna to the transmitter.

Two identical reception channels are provided, which process the signals drawn by two power circulators 3 and 4. In the conventional way, each channel comprises a limiter 7, 8, an amplifier 9, 10, a mixer 11, 12 for changing to an intermediate frequency, an intermediate-frequency amplifier 15, 16 then a logarithmic amplifier 17, 18 for obtaining a large dynamic range and an analogue/digital coder 19, 20. The coded signals are sent to a digital processing device 21 according to the invention, which will be dealt with in detail below and which delivers as its output the reflectivity factor Z and precipitation rate R after they have been corrected. The mixers 11 and 12 furthermore receive the signal from a local oscillator 13 which is controlled by an automatic frequency control circuit 14.

For certain meteorological applications, in which it is desirable to obtain complementary information pertaining to the nature of the hydrometeors, it is advantageous to measure the phase of the received signals using additional Doppler reception channels. These channels comprise a vector demodulation circuit 22, 25 followed by two analogue/digital coders 23, 24, on the one hand, and 26, 27, on the other hand, for delivering the quadrature-coded signals $I_H, Q_H$, in the case of channel $\vec{H}$, and $I_V, Q_V$ in the case of channel $\vec{V}$.

The principle of the method according to the invention is as follows. On the basis of a single polarization, for example the $\vec{H}$ channel, the equation relating the attenuated reflectivity factor $Z_{Ha}(r)$ measured in the rain (or another hydrometeor) at a distance r to the attenuation coefficient a can be written:

$$Z_{Ha}(r) = Z_o(r) - 2\Delta r \sum_{i=1}^{n-1} a_i \qquad (1)$$

where $Z_O(r)$ is the unattenuated reflectivity factor, $\Delta r$ is the width of a range gate, $a_i$ is the attenuation coefficient belonging to the range gate of rank i, expressed in dB per unit length, where $Z_{Ha}(r)$ and $Z_o(r)$ are expressed in dBZ, that is to say=10 log Z in mm$^6$m$^{-3}$, and where r=n$\Delta$r.

The attenuation coefficient is connected with the precipitation rate R by the known equation:

$$\alpha = k_H R^{\gamma_H} \qquad (2)$$

where $k_H$ and $\gamma_H$ are parameters pertaining to the polarization $\vec{H}$ which depend weakly on the temperature and drop-size distribution (DSD) and which can be calculated for each wavelength.

Combining equations (1) and (2) gives:

$$Z_o(r) = Z_{Ha}(r) + 2\Delta r k_H I_1(r, R) \qquad (3)$$

with:

$$I_1(r, R) = \sum_{i=1}^{n-1} R_i^{\gamma_H} \qquad (4)$$

$I_1$ represents the integral of the precipitation rate along the beam of the radar for the chosen $\vec{H}$ polarization, that is to say it expresses the cumulative attenuation in the n−1 range gates preceding the gate n.

Now, there is a known relationship between the reflectivity factor Z due to the rain and the precipitation rate R:

$$Z = \alpha R^\beta \qquad (5)$$

where $\alpha$ and $\beta$ are parameters. Equation (4) can thus be written in the equivalent form:

$$I_1(r, R) = \alpha^{-\gamma/\beta} \sum_{i=1}^{n-1} Z_i^{\gamma/\beta} \qquad (4')$$

The parameters $\alpha$ and $\beta$ depend strongly on the DSD. By using approximate values for the four parameters k, $\gamma$, $\alpha$ and $\beta$ in equations (3) and (5), corrected estimates Z'(r) can be calculated on the basis of the series of n measured values $Z_a(r)$ by using an iterative method proposed by P. H. Hildebrand in 1978 in "Iterative correction for attenuation of 5 cm radar in rain" J.Appl.Meteor., 17, pages 508–514. As indicated in this article, errors in the DSD and temperature which are assumed can seriously degrade these attenuation estimates, but these degradations are small in comparison with those resulting from errors in calibrating the radar. Since the parameters affected by the radar calibration error are those in the equation relating Z to R, the essential uncertainty pertaining to $I_1(r,R)$ results from the uncertainty pertaining to the parameters $\alpha$ and $\beta$.

In order to resolve these uncertainties, differential measurements using both polarizations of a radar are therefore employed. The differential reflectivity $Z_{DR}$ is defined by:

$$Z_{DR} = Z_H - Z_V \qquad (6)$$

where Z is expressed in dBZ and where the indices H and V correspond to the two polarizations of the radar, for example horizontal and vertical.

For the attenuated wavelengths, using equation (1) for the H and V polarizations and subtracting the V terms from the H terms gives:

$$Z_{DRa}(r) = Z_{DRs}(r) - 2A_{DP}(r) \qquad (7)$$

where $Z_{DRa}$ is the attenuated polarimetric radar measurement, $Z_{DRs} = Z_{OH} - Z_{OV}$ is the unattenuated differential reflectivity coefficient due solely to the shape of the drops, and $A_{DP}$ is the differential polarimetric attenuation for a path of the electromagnetic wave, i.e.:

$$A_{DP}(r) = \Delta r \sum_{i=1}^{n-1} (a_{iH} - a_{iV}) \qquad (8)$$

With an assumed DSD, the differential reflectivity coefficient $Z_{DRs}$ due to the shapes of the drops can be calculated as a function of the precipitation rate:

$$Z_{DRs}=f(R) \quad (9)$$

The attenuation coefficients $a_{iH}$ and $a_{iV}$ in equation (8) are given by equation (2) for the H and V polarizations. With the DSD having been assumed, the parameters $k_H$, $k_V$, $\gamma_V$ and $\gamma_V$ can be calculated. Calculation shows that the difference $a_H - a_V$ does not depend significantly on the DSD. For a given wavelength, $k_H$ and $k_V$ are very different, but $\gamma_H \approx \gamma_V \approx \gamma$.

Combining equations (2) and (8) therefore gives:

$$A_{DP}(r) = \Delta r(k_H - k_V)I_2(r, R)) \quad (10)$$

with:

$$I_2(r, R) = \sum_{i=1}^{n-1} R_i^r \quad (11)$$

It may be noted that equation (11) can be written in a similar way as equation (4'), that is to say as a function of Z.

$I_2(r,R)$ represents the precipitation rate integral deduced from the differential attenuation $A_{DP}$, $k_H-k_V$ assumed to be accurately known. Since it results from a differential measurement, $A_{DP}$ does not depend on the calibration of the radar.

This being the case, in the estimation of $I_1$ and $I_2$ only the parameters $\alpha$ and $\beta$ are variable, because of the natural variability of the DSD in the rain and the calibration errors.

In the method according to the invention, it is proposed to keep $\beta$ at a constant value, equal to a climatological mean value which corresponds to the wavelength and the type of rainfall which is observed, and to adjust the parameter $\alpha$ by using the differential attenuation $A_{DP}$.

This assumption regarding $\beta$ has been confirmed by numerous measurements available in the literature.

The principle is therefore to determine $I_1$ on the basis of the series of measurements for a single one of the polarizations while choosing an arbitrary intermediate value of $\alpha$, to estimate $I_2$ on the basis of the differential radar measurements and a calculation using $I_1$ for estimating the unattenuated differential reflectivity factor, and to compare $I_1$ and $I_2$ so as if appropriate to change $\alpha$ until $I_1 \approx I_2$, which then makes it possible to extract the corrected estimates of the unattenuated reflectivity coefficients $Z_t(r)$ and the precipitation rates $R_t(r)$.

Figure 2:
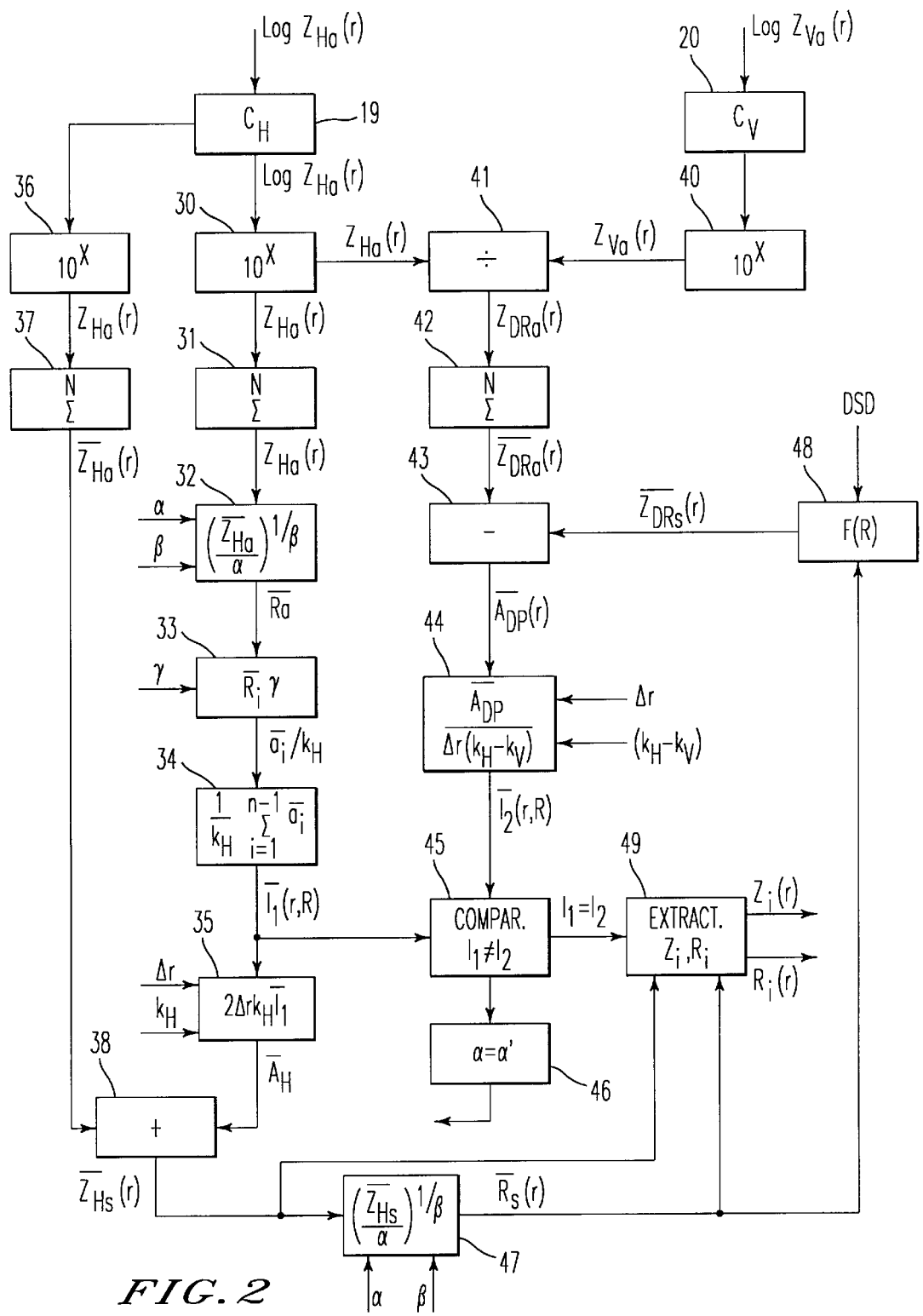
FIG. 2 is a block diagram of a digital signal processing device for making use of the method according to the invention.

FIG. 2 represents a digital processing device which makes it possible to make use of this method. The left-hand part of the figure relates to the processing of a single polarization, the H polarization, while the right-hand part relates to the differential processing.

The logarithmic signals delivered by the coder 19 of the H channel are converted back into linear signals $Z_{Ha}(r)$ in step 30. These signals are averaged over N pulses of the radar (step 31), then the estimated precipitation rate $\overline{R}_\alpha$ is calculated, on the basis of parameters $\alpha$ and $\beta$ which are predetermined, arbitrary in the case of $\alpha$, according to equation (5) (step 32), and this is done for each range gate i.

Step 33 consists in calculating the attenuation coefficients $\overline{\alpha}_i$ on the basis of equation (2).

The estimates of value $\overline{I}_1(r,R)$ is then deduced therefrom according to equations (2) and (4) (step 34).

Furthermore, the attenuated reflectivity factor $\overline{Z}_{H\alpha}(r)$ deduced from the series of measurements for the single polarization H is calculated by steps 36 and 37, and the attenuation term $\overline{A}_H$ in equation (3) is estimated by step 35. Applying this equation (3) by step 38, consisting in a summation, provides an estimate $Z_{Hs}(r)$ of the unattenuated reflectivity coefficient for the H polarization, then, by step 47, an estimate of the corrected precipitation rate $\overline{R}_s(r)$ by applying equation (5) with the parameters $\alpha$ and $\beta$ which have already been chosen.

On the basis of this estimated value, it is possible by step 48 to calculate an estimated value of the unattenuated differential reflectivity factor $Z_{DRs}(r)$ according to equation (9).

Furthermore, starting with the coded signals for the H and V channels which are delivered by 30 and 40, the ratio $Z_{Ha}(r)/Z_{Va}(r)$ is taken (step 41), giving the attenuated polarimetric radar measurement $Z_{DRa}(r)$ which is then averaged over N pulses in step 42. The difference (step 43) between this averaged value and the estimated value of the unattenuated differential reflectivity factor delivered by 48 constitutes the estimate $\overline{A}_{DP}(r)$ of the differential polarimetric attenuation. On the basis of the values $\Delta r$ and $k_H - k_V$, step 44 delivers the estimated value of $\overline{I}_2(r,R)$ according to equation (10). $\overline{I}_1$ and $\overline{I}_2$ are then compared in step 45.

If $\overline{I}_1 \neq \overline{I}_2$, then step 46 consists in changing the parameter $\alpha$ by an increment $\Delta\alpha$ in the appropriate direction, and in applying the new value $\alpha'$ to steps 32 and 47 in order to resume the calculations. These operations are repeated until $\overline{I}_1 = \overline{I}_2$ is obtained, which corresponds to the correct value being given to $\alpha$. It is then possible (step 49) to extract the corrected values of the unattenuated reflectivity factor $Z_t(r) = \overline{Z}_{Hs}(r)$ and the precipitation rate $R_t(r) = \overline{R}_s(r)$.

In the explanation of the principle of the method according to the invention, it was assumed for equation (9) that $Z_{DRs}$, as well as $k_H$ and $k_V$ for equation (10), were calculated for the single assumed DSD. This is acceptable because, for given climatic conditions, the averaged DSDs are stable parameters. It is therefore possible to choose a particular DSD on the basis of climatological considerations.

Furthermore, it is preferable to choose range gates at the distance r where the reflectivity factor is low, because $Z_{DRs}$ is then low and the error in estimation according to equation (9) is for its part also low. This choice of a particular gate is all the more justified and facilitated since a gate at the distance r can be replaced by another one around r with different reflectivity factors, without the factors $I_1, I_2$ and $\alpha$ being significantly changed.

It is then possible to calculate $\alpha$ on the basis of two or three contiguous gates, and to use the average in order to reduce the effects of dispersion in the DSD.

It may also be noted that an observed radial direction can be subdivided into several segments, to which the method according to the invention may be applied simultaneously.

The method described above is very insensitive to random sampling errors affecting the reflectivity coefficient measured by the radar for one polarization, or affecting the differential values.

One of the principal advantages of the method according to the invention has already been mentioned: this is its independence of the calibration of the radar and the attenuation due to undetected clouds.

It may be added that another possible use is the qualitative detection of hail. The explanation for this is that, when hail is present in a rain cell, since the hailstones have a substantially spherical shape, they produce a high reflectivity factor for both polarizations, with $Z_H \approx Z_V$, and therefore a substantially zero differential reflectivity factor. On the other hand, there is a strong attenuation independent of the polarization, whence a zero contribution to the differential attenuation $A_{DP}$. The presence of hail thus modifies $I_1$, but does not correspondingly modify $I_2$, in contrast to the case of uniform rain. A significant change in α is then observed, and this can be used as an indication of hail.

It should also be noted that, although the above description was given in the context of using the differential polarimetric attenuation $A_{DP}$, the method according to the invention could also be made to work with the differential phase shift $K_{DP}=K_H-K_V$, expressed in degrees.km of propagation.

Obviously, the examples which have been described do not limit the invention in any way. In particular, the meteorological radar which has been described could use a single reception channel instead of the two channels described, the signals for the two polarizations being switched on input in order to use the channel in time division, and "unswitched" on output. The switching rate simply needs to be chosen so that the signals received for the polarizations H and V are not decorrelated during the switching time.

Furthermore, it may be noted that the signals I and Q available on the outputs of the Doppler channels make it possible to calculate the signal amplitude $\sqrt{I^2+Q^2}$ in each of the channels H and V, and this amplitude could be used in place of the signals output by the coders 19 and 20 in order to avoid using the channels 17, 19 and 18, 20. However, the drawback with this is that it would not provide the dynamic range resulting from the use of logarithmic amplifiers.

Lastly, in the processing device according to the invention in FIG. 2, it is conceivable to continue to use the logarithmic signals instead of converting back into linear signals.

We claim:

1. Method for determining the precipitation rate and reflectivity factor of a hydrometeor using pulsed radar operating at a wavelength which is attenuated by the said hydrometeor, the said radar being a dual polarization radar delivering a double series of measurements of the attenuated reflectivity factor ($Z_{Ha}$ (r), $Z_{Va}$ (r)) for the various range gates according to each of the polarizations, the said method being characterized in that it comprises the following steps:

A) in each range gate of the radar, determining a first estimate of the precipitation rate ($R_s$) on the basis of the reflectivity factor measured for a single polarization, by a combination of the equations connecting the reflectivity factor with the precipitation rate and the attenuation coefficient for a single polarization with the precipitation rate;

B) on the basis of the said first estimate of the precipitation rate, obtaining an estimated value of the unattenuated differential reflectivity factor ($Z_{DRs}$);

C) from the said estimated value of the unattenuated differential reflectivity factor ($Z_{DRs}$) and the radar measurement of the attenuated differential reflectivity factor ($Z_{DRa}$), deducing an estimated value of the differential polarimetric attenuation ($A_{DP}$); and D) attempting to obtain equality between the integral ($I_1$ (r, R)) of the precipitation rate estimated in step A for a single polarization of the radar and the integral ($I_2$ (r, R)) of the precipitation rate deduced from the said differential polarimetric attenuation ($A_{DP}$), by iterative adjustment of one of the parameters (α, β) in the equation connecting the reflectivity factor with the precipitation rate, so as to make it possible to extract the corrected values of the unattenuated reflectivity factor ($Z_{Hs}$ (r)) and the precipitation rate ($R_s$ (r)).

2. Method according to claim 1, characterized in that step A) comprises the following steps:

a) for a first of the said series of measurements ($Z_{Ha}$ (r)), calculating estimated values of the precipitation rate ($R_i$) for the various range gates (1 to n−1) on the basis of arbitrarily fixed parameters (α, β);

b) from the said estimated values of the precipitation rate ($R_i$), deducing a first estimated value (I, (r, R)) characteristic of the attenuation due to the precipitation, the said first estimated value being the integral of the precipitation rate estimated for a single polarization;

c) on the basis of the said first estimated value ($I_1$ (r, R)) and a first series of measurements ($Z_{Ha}$ (r)), determining an estimated value of the unattenuated reflectivity factor ($Z_{Hs}$ (r)) and the corrected precipitation rate ($R_s$).

3. Method according to claim 1, characterized in that the said step B) comprises the following step:

d) on the basis of the said estimated value of the corrected precipitation rate ($R_s$) and a given drop-size distribution (DSD), calculating an estimated value of the unattenuated differential reflectivity factor ($Z_{DRs}$(r)).

4. Method according to claim 1, characterized in that the said step C) comprises the following steps:

e) on the basis of the said double series of measurements of the attenuated reflectivity factor ($Z_{Ha}$ (r), $Z_{Va}$ (r)), calculating the measurement of the attenuated differential reflectivity factor ($Z_{DRa}$ (r));

f) from the measurement of the attenuated differential reflectivity factor ($Z_{DRa}$ (r)) and the estimated value of the unattenuated differential reflectivity factor ($Z_{DRs}$ (r)) obtained during step d), deducing an estimated value of the differential polarimetric attenuation ($A_{DP}$).

5. Method according to claim 1, characterized in that the said step D) comprises the following steps:

g) from the said estimated value of the differential polarimetric attenuation ($A_{DP}$), deducing a second estimated value ($I_2$ (r, R)) characteristic of the attenuation due to the precipitation, namely the integral of the precipitation rate;

h) comparing the said first ($I_1$ (r, R)) and second ($I_2$ (r, R)) estimated values characteristic of the attenuation due to the precipitations;

i) if the said comparison according to step h) indicates that the said first and second estimated values are different, changing at least one of the said parameters (α, β) in step a) and repeating steps a) to h);

j) if the said comparison according to step h) indicates that the said first and second estimated values are equal, extracting the said estimated values of the unattenuated reflectivity factor ($Z_{Hs}$ (r)) and of the corrected precipitation rate ($R_s$).

6. Method according to claim 2, characterized in that step a) consists in:

a.1) averaging the said measurements ($Z_{Ha}$ (r)) in the said first series over N pulses of the radar;

a.2) for each range gate (i), calculating estimated values of the precipitation rate ($\overline{R}_i$) on the basis of arbitrarily fixed parameters (α, β), according to the equation:

$$\overline{R}_i = \left(\frac{\overline{Z}_{Ha}(r)}{\alpha}\right)^{1/\beta}.$$

7. Method according to claim 2, characterized in that step b) consists in:

b.1) on the basis of the estimated values of the precipitation rate ($\overline{R}_i$), calculating the attenuation coefficients ($\overline{\alpha}_i$) in each range gate, according to the equation:

$$\overline{\alpha}_i/k_H = \overline{R}_i^{\gamma_H}$$

where $k_H$ and $\gamma_H$ are predetermined parameters for a given temperature and a given drop-size distribution; and b.2) from these attenuation coefficients ($\overline{\alpha}_i$), deducing the said first estimated value ($\overline{I}_1(r,R)$), according to the equation:

$$\overline{I}_1(r, R) = \sum_{i=1}^{n-1} \overline{\alpha}_i / k_H$$

where n is the number of range gates for a distance r from the radar.

8. Method according to claim 2, characterized in that step c) consists in:

c.1) on the basis of the said first estimated value ($\overline{I}_1(r,R)$), calculating an attenuation value $\overline{A}$ such that:

$$\overline{A} = 2\Delta r k_H \overline{I}_1(r,R)$$

where $\Delta r$ is the width of a range gate;

c.2) averaging the said measurements ($Z_{Hz}(r)$) in the said first series over N pulses of the radar;

c.3) taking the sum of the said attenuation $\overline{A}$ and the averaged value of the attenuated reflectivity factor $\overline{Z}_{H\alpha}(r)$ in order to obtain an estimated value $\overline{Z}_{Hs}(r)$ of the unattenuated reflectivity factor; and c.4) calculating an estimated value $\overline{R}_s$ of the corrected precipitation rate, according to the equation:

$$\overline{R}_s = \left(\frac{\overline{Z}_{Hs}(r)}{\alpha}\right)^{1/\beta}$$

9. Method according to claim 4, characterized in that step e) consists in:

e.1) taking the ratio of the measurements in the series of the said double series ($Z_{H\alpha}(r), Z_{V\alpha}(r)$), in order to obtain the values of the attenuated differential reflectivity factor ($Z_{DR\alpha}(r)$) of the radar;

e.2) averaging the said values of the attenuated differential reflectivity factor over N pulses of the radar.

10. Method according to claim 5, characterized in that step f) consists in taking the difference between the said estimated value of the unattenuated differential reflectivity factor ($\overline{Z}DRs(r)$) obtained according to step d) and the said averaged value of the attenuated differential reflectivity factor ($\overline{Z}_{DR\alpha}(r)$), in order to obtain an estimated value of the differential polarimetric attenuation ($\overline{A}_{DP}(r)$) for a radar path.

11. Method according to claim 5, characterized in that step g) consists in, on the basis of the said estimated value of the differential polarimetric attenuation ($\overline{A}_{DP}(r)$), calculating the said second estimated value $\overline{I}_2(r,R)$, according to the equation:

$$\overline{I}_2(r, R) = \frac{\overline{A}_{DP}(r)}{\Delta r(k_H - k_V)}$$

where $k_v$ is a parameter predetermined, in the same way as $k_h$, for the second series of measurements ($Z_{V\alpha}(r)$).

12. Dual polarization meteorological radar operating with pulses at a wavelength which is attenuated by hydrometeors, for determining the precipitation rate and the reflectivity factor, the said radar having:

a dual polarization antenna (1) associated with means (2, 3, 4) for extracting the modes corresponding to two orthogonal polarization channels $\vec{H}$ and $\vec{V}$;

a transmitter (5, 6) delivering pulses to the two channels of the said antenna;

at least one reception channel (7, 9, 11, 13, 15, 17, 19; 10, 12, 13, 16, 18, 20) for processing the signals output by the two orthogonal polarization channels;

the said radar being characterized in that it has a digital signal processing device (21) designed for implementing the method according to claim 1.

13. Radar according to claim 12, characterized in that, at the output of the said reception channels, it comprises logarithmic amplifiers (17, 18) for increasing the dynamic range, and in that the said digital processing device (21) has conversion means (30, 36, 40) at its input in order to recover the values of the received signals.

14. Radar according to claim 12, characterized in that it furthermore comprises two Doppler reception channels (22 to 24; 25 to 27), associated respectively with the outputs of the reception channels for the two polarizations.

15. Radar according to claim 12, characterized in that it has a single reception channel, associated with input and output switching means controlled synchronously in order to process the two polarizations alternately, the switching rate being such that the signals received in the two polarizations are not decorrelated during the switching time.

16. Method according to claim 2, characterized in that the said step B) comprises the following step:

d) on the basis of the said estimated value of the corrected precipitation rate ($R_s$) and a given drop-size distribution (DSD), calculating an estimated value of the unattenuated differential reflectivity factor ($Z_{DRs}(r)$).

17. Method according to claim 2, characterized in that the said step C) comprises the following steps:

e) on the basis of the said double series of measurements of the attenuated reflectivity factor ($Z_{Ha}(r), Z_{Va}(r)$), calculating the measurement of the attenuated differential reflectivity factor ($Z_{DRa}(r)$);

f) from the measurement of the attenuated differential reflectivity factor ($Z_{DRa}(r)$) and the estimated value of the unattenuated differential reflectivity factor ($Z_{DRs}(r)$) obtained during step d), deducing an estimated value of the differential polarimetric attenuation ($A_{DP}$).

18. Method according to claim 3, characterized in that the said step C) comprises the following steps:

e) on the basis of the said double series of measurements of the attenuated reflectivity factor ($Z_{Ha}(r), Z_{Va}(r)$), calculating the measurement of the attenuated differential reflectivity factor ($Z_{DRa}(r)$);

f) from the measurement of the attenuated differential reflectivity factor ($Z_{DRa}(r)$) and the estimated value of the unattenuated differential reflectivity factor ($Z_{DRs}(r)$) obtained during step d), deducing an estimated value of the differential polarimetric attenuation ($A_{DP}$).

19. Method according to claim 2, characterized in that the said step D) comprises the following steps:

g) from the said estimated value of the differential polarimetric attenuation ($A_{DP}$), deducing a second estimated value ($I_2(r, R)$) characteristic of the attenuation due to the precipitation, namely the integral of the precipitation rate;

h) comparing the said first ($I_1(r, R)$) and second ($I_2(r, R)$) estimated values characteristic of the attenuation due to the precipitations;

i) if the said comparison according to step h) indicates that the said first and second estimated values are different, changing at least one of the said parameters ($\alpha$, $\beta$) in step a) and repeating steps a) to h);

j) if the said comparison according to step h) indicates that the said first and second estimated values are equal, extracting the said estimated values of the unattenuated reflectivity factor ($Z_{Hs}$ (r)) and of the corrected precipitation rate ($R_s$).

20. Method according to claim 3, characterized in that the said step D) comprises the following steps:

g) from the said estimated value of the differential polarimetric attenuation ($A_{DP}$), deducing a second estimated value ($I_2$ (r, R)) characteristic of the attenuation due to the precipitation, namely the integral of the precipitation rate;

h) comparing the said first ($I_1$ (r, R)) and second ($I_2$ (r, R)) estimated values characteristic of the attenuation due to the precipitations;

i) if the said comparison according to step h) indicates that the said first and second estimated values are different, changing at least one of the said parameters ($\alpha$, $\beta$) in step a) and repeating steps a) to h);

j) if the said comparison according to step h) indicates that the said first and second estimated values are equal, extracting the said estimated values of the unattenuated reflectivity factor ($Z_{HS}$ (r)) and of the corrected precipitation rate ($R_s$).

\* \* \* \* \*